United States Patent [19]

Bronson

[11] Patent Number: 5,305,435
[45] Date of Patent: Apr. 19, 1994

[54] COMPUTER WINDOWS MANAGEMENT SYSTEM AND METHOD FOR SIMULATING OFF-SCREEN DOCUMENT STORAGE AND RETRIEVAL

[75] Inventor: Barry Bronson, Saratoga, Calif.

[73] Assignee: Hewlett-Packard Company, Palo Alto, Calif.

[21] Appl. No.: 57,938

[22] Filed: May 7, 1993

Related U.S. Application Data

[63] Continuation of Ser. No. 554,237, Jul. 17, 1990, abandoned.

[51] Int. Cl.⁵ .......................................... G06F 15/62
[52] U.S. Cl. .................................. 395/159; 395/157
[58] Field of Search .......................... 395/155, -161; 340/712-713, 723, 709-710; 345/119-121, 901

[56] References Cited

U.S. PATENT DOCUMENTS

| | | | |
|---|---|---|---|
| 4,555,775 | 11/1985 | Pike | 395/158 |
| 4,653,020 | 3/1987 | Cheselka et al. | 395/157 |
| 4,712,191 | 12/1987 | Penna | 395/159 |
| 4,769,636 | 9/1988 | Iwami et al. | 395/158 X |
| 4,780,709 | 10/1988 | Randall | 345/120 |
| 4,783,648 | 11/1988 | Homma et al. | 345/120 |
| 4,819,189 | 4/1989 | Kikuchi et al. | 395/158 |
| 4,831,556 | 5/1989 | Oono | 395/157 |
| 4,862,389 | 8/1989 | Takagi | 395/158 X |
| 4,899,136 | 2/1990 | Beard et al. | 395/159 X |
| 5,060,170 | 10/1991 | Bourgeois et al. | 395/157 |
| 5,107,443 | 4/1992 | Smith et al. | 395/158 |
| 5,140,677 | 8/1992 | Fleming et al. | 395/157 X |
| 5,140,678 | 8/1992 | Torres | 395/159 |

OTHER PUBLICATIONS

Seybold, "Windows 30", Andrew Seybold's Onlook on Professional Computing, May 1990, p. 1 (4).
Seybold et al., "Doing Windows", Andrew Seybold-'Outlook on Professional Computing, May 1990, p. 6 (3).
McMullen et al., "Microsoft Introduces Windows 3.0", Newsbytes, May 24, 1990.
Microsoft Windows User's Guide, vol. 3.0, Microsoft Corp., 1990, pp. 5-76.
Carman, Chip, "Tip Sheet", Mac User, Jul. 1988, pp. 125-130.
Petzold, Charles, "Introducing the OS-2 Presentation Manager", PC Magazine, Jul. 1988, pp. 379-389.

*Primary Examiner*—Heather R. Herndon
*Assistant Examiner*—John E. Breene

[57] ABSTRACT

A novel computer display interface which simulates familiar document handling activities based upon a unique display metaphor representative of a standard office filing system and work area of a desk. The display system includes multi-windows which are displayed in a central screen area designated for just active computer windows. The interface further includes designating the edge areas of the screen for displaying window tabs of inactive windows. The window tabs are arranged in a way to simulate an integrated filing system, and to provide a convenient method of organizing and viewing computer files.

10 Claims, 13 Drawing Sheets

COMPUTER WINDOWS MANAGEMENT SYSTEM AND METHOD FOR SIMULATING OFF-SCREEN DOCUMENT STORAGE AND RETRIEVAL

This is a continuation of copending application Ser. No. 07/554,237 filed on Jul. 17, 1990.

TECHNICAL FIELD

The present invention relates to the presentation of computer windows, and more particularly to a system and method for providing a display arrangement useful in managing multiple computer windows.

BACKGROUND ART

In the computer industry much effort has gone into designing user interfaces which are easy to use and learn. Early user interfaces were character-based, that is, the computer was operated by a set of character-based commands. It was absolutely necessary that the commands were entered correctly and with the proper syntax, otherwise the desired operation would not be performed. Character-based user interfaces are still widely used.

Although the command sets of character-based interfaces were generally logically constructed, it was recognized that to efficiently operate a computer the user was required to memorize command sets. This often is a difficult task, especially as more commands become available and necessary. To simplify the task of learning how to operate a computer, graphics-based interfaces have been developed. Now, rather than using commands to operate the computer, graphical symbols and defined actions are used.

These graphics-based interfaces are typically designed around some kind of metaphor, i.e. a symbol or set of symbols associated with the computer operation or operations. A metaphor allows the user to better associate the operations required by the interface with something that is familiar. Commonly, the metaphor is that of an index card file, with one card stacked atop another with a slight offset, giving the illusion of vertical stacking. In this way the operations are somewhat intuitive since they borrow actions and familiar concepts related to index card filing.

Icons are often used as part of the metaphor to represent the applications, computer files and system elements that are available. To perform a command the user is required to do something with the icons, such as "dragging" one icon over to and dropping it on another icon. A cursor pad or a mouse is used for this purpose. Another example would be to click on an icon, after which a pull-down or pop-up menu would appear. Graphical interfaces generally reduce the difficulty in learning how to operate a computer system, since memorizing long sets of word based commands and syntax is not required.

To further aid computer productivity it became desirable to provide a "multi-tasking" environment in which a user could implement several applications at the same time. A convenient and effective method of providing multi-tasking has been provided by the development of multi-window systems. In such systems, different computer windows, i.e. software applications or data files, may be opened and used by the user simultaneously. Computer windows appear on the display monitor of a computer as a virtual window, that is, the contents of a file associated with the window may be viewed within the area described by the window. Several windows may appear on the display monitor at the same time and often appear as if they are layered, one on top of another. For ease of use these multi-window systems often incorporate the features of icons and pulldown menus found in graphics interfaces.

A well-known multi-window graphics interface, called the Macintosh interface from Apple Computers, opens and closes windows with the use of icons which look like miniature file folders. When a window is closed in this system, the contents of the window collapse down into the file folder icon. The icon remains in the central portion of the computer screen. Several layers of windows, i.e. a vertical stack, are made available in this manner. Moving these icons to other parts of the screen requires manual use of a mouse.

The screen display is organized in this and other similar interfaces by a series of windows. A main window contains primary file folders. This window generally occupies a large portion of the screen. To see the contents of a particular primary file folder, the user is required to point and click on the icon of that particular file folder. A pop-up window of icons representing the different files and contents of the file folder is then displayed. This pop-up window generally overlaps and hides part of the main window. To actually see the text of a file another point and click procedure must be done. This results in yet another window appearing on the screen which completely fills the screen and hides the other vertically stacked windows. While open, the source of this text file window is not readily apparent, that is from which file folder it came.

The display screen becomes even more crowded and complex if the contents of two or more primary file folders are desired. Furthermore, there may be several main windows depending on how the storage device is divided. Thus, the user may become lost as to where in the vertical hierarchy of the files he or she is at any given moment. Moreover, to implement or view another file the user must "back track" out through the vertical stack. For example, if one was working on a document and wanted to view their appointments calendar file, the user would have to get out of the document file and go back through the stack to a window containing the appointments calendar file.

Examples of other multi-window systems which make use of a mouse are found in U.S. Pat. Nos. 4,831,556, to Oono, 4,819,189, to Kakuchi et al., and 4,783,648, to Homma et al. The patent to Oono describes a window display which gives the position and size of a window. The patent to Kakuchi et al. is directed to automatically bringing a computer window in front of other windows when a cursor is directed into that window. And the patent to Homma et al. is directed to automatically shifting positions of windows based on display priority.

Still other multi-window systems have focused their attention on how to display and activate the various windows on the screen. Systems with this focus are exemplified in U.S. Pat. Nos. 4,862,389, to Takagi, 4,780,709, to Randall, 4,769,636, to Iwami et al., 4,653,020, to Cheselka et al., and 4,555,775 to Pike.

Although the above graphics-based user interface systems represent a significant improvement over character-based interfaces, these systems do not accurately simulate real world document handling activities. For instance, a document does not collapse down into a small icon. Moreover, the organization of computer files is not always discernible with these systems and this places the burden of memorizing the organization of the files on the user.

Therefore, in view of the above, it is an object of the present invention to devise a multi-window computer interface based upon a display metaphor which is intuitive, well organized and easy to understand.

It is another object of the present invention to provide in a multi-window interface an automatic means for identifying and organizing computer windows, which is based upon familiar document handling activities.

SUMMARY OF THE INVENTION

The above objects have been achieved by a novel computer windows management system and interface which simulates familiar real-world document handling activities by making use of a window identification display about the periphery of a screen, leaving the central screen area clear of non-active windows. The central screen display area is reserved for displaying computer windows which have an active display status. The screen also has a surrounding edge area which is designated for displaying identifiers associated with computer windows which have an inactive display status. A window's display status is independent of its operating status, e.g., open, active and running. For instance, an application can be running in the CPU even if it has an inactive display status. Organizing the display screen in this manner creates more of a horizontal organization to the windows than a vertical stack.

The present user interface system includes a means for automatically creating an identifier for each computer window as it changes from an active to an inactive display condition. The identifier acts as a handle to the window with which the window may be manipulated. An operator controlled cursor is also provided so that a user may select and manipulate a computer window by placing the cursor either on the window's identifier or inside the window. In this manner windows can be moved on and off the screen.

To simulate a filing system the identifiers may look like file tabs. An identifier which looks like a file tab is called a window tab. Moving a window from one of the designated screen areas to the other may be accomplished by either "dragging" the window by its window tab using the cursor, or by clicking on the window tab or window so that the window simply "pops" from the edge area to the central screen area and vice versa.

The window tabs may be placed automatically or manually in a hierarchical order along the edges of the screen. The order in which window tabs may be arranged includes clusters, multi-levels and parallel levels. Clusters are groups of related windows or files that are on the same horizontal level within the overall organization. Multi-levels means that there are vertical levels within the organization. And parallel levels means that there are separate branches to the order. Hence, a virtual filing system is created along the screen edges which simulates a standard office filing system. By virtual it is meant that the inactive windows cannot be seen, but since the windows appear to slide on and off the screen, one gets the sense that the non-displayed windows are just off the sides of the screen waiting to be pulled back into view. To help identify these non-displayed windows and to increase the association with a filing system, the window tabs may include representations of filing cabinets, drawers, file folders and other common filing items.

For example, one may organize all word processing documents under one window tab called "Documents". Included on this window tab may be an icon of a file cabinet. The next level of organization may have window tabs such as "letters", "memos", and the like. Each of these window tabs may include an icon of a file drawer. Within the letters "drawer" there may be any number of files. One such file may be identified by a window tab such as "Mom, 2/25/90". A particular letter may now be selected and displayed. Known search routines may be incorporated to aid in finding a particular file or document.

Color coding, patterning or blinking selected window tabs may help identify a particular window or group of windows. For instance, all the window tabs for windows related to a particular applications program could be of one color scheme. Alternatively, the tabs for each vertical level could be of a different color scheme. How window tabs are color coded may be user selectable or automatically assigned. Other examples of ways in which windows may be identified are that the window tabs could be "textured" using specific graphical patterns or could be caused to blink when their application is still running, even though the window is not in view.

The tabs may be arranged along any of the four edges of the screen. Thus, for instance, a user could organize the window tabs relating to one type of application, such as spreadsheets along the bottom, all graphics related window tabs along the right, all word processing window tabs along the left, and all system window tabs along the top of the screen. For user convenience, any labels on the window tabs may be automatically orientated dependent upon which side of the screen the tab is placed, so that the labels may be easily read. As has already been exemplified above, the labeling of the window tabs may include alphanumerics, icons, color, patterns, blinking, etc., or some combination of them all.

The display of multi-windows in the central display area of the screen may operate in a manner similar to the known methods for displaying multi-windows. Alternatively, a currently displayed active window may be automatically displaced by opening another window. The displaced window would become a window with an inactive display status, but functions which were previously in progress would be carried out in background. The window tab for the displaced window would automatically appear along the screen edge at either its last location, its proper place within a hierarchical order, or in a designated area for non-displayed windows whose applications are in operation. Causing the window tab to blink on and off while the function is still being performed would help keep the user informed on the operating status of the displaced window.

An advantage of the present invention is that a user interface is provided which emulates real world desktop activities and filing systems. Therefore, the interface is easy to learn, since it is intuitive. Indeed, little time would be required to teach individuals how to use this interface, because the display metaphor relies upon familiar activities and symbols.

Another advantage of the present invention is that it provides a simple way to organize computer windows and files, and does so in a manner so that the order in which the windows are organized is readily determined and always available. Because the window tabs are always displayed in a horizontal manner, the user would not have to "back track" through different levels of windows to find where a file came from. Perhaps more importantly, the work area of the screen, much like the work area of a desk, may be kept clear of items which are not currently being worked on, while at the same time all other applications and data files are readily available to be brought back into the work area. This not only simulates the work area of a desk, but also provides at one's fingertips, so to speak, all the file cabinets, drawers and folders one has created in the computer. Finding a file is made less difficult since window tabs for each window or file are provided along the edges of the screen. Moreover, known search routine techniques may be incorporated to find a desired window. Thus, one could search through the window tabs and pull out a window or file for viewing much like searching through a file drawer.

BEST MODE FOR CARRYING OUT THE INVENTION

Figure 1:
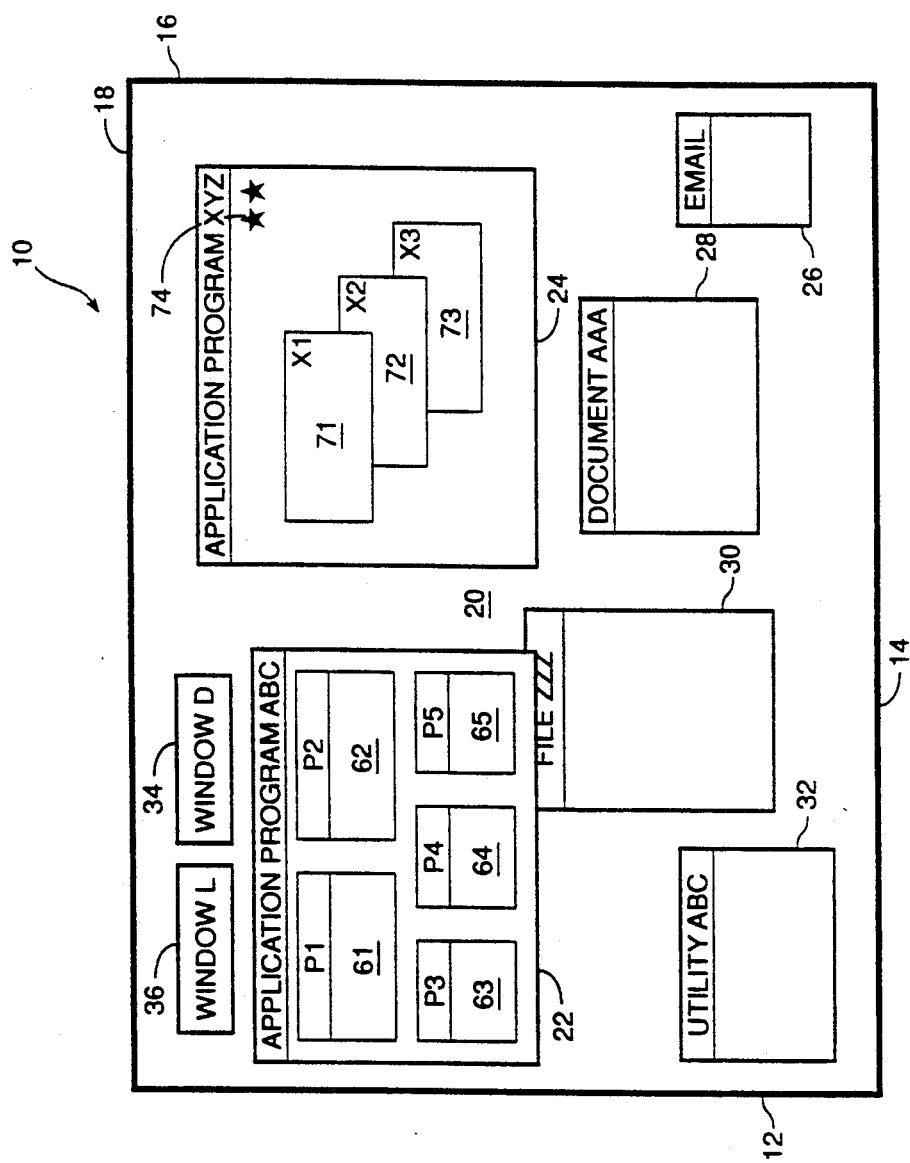
FIGS. 1-3 are display screens showing removal of computer windows from a central area of a computer display screen in accord with a preferred embodiment of the present invention.

Referring to FIG. 1, a computer screen 10 is shown having multiple windows therein. The windows represent either application programs or data files. The screen 10 has a left screen edge 12, a bottom edge 14, a right edge 16 and a top edge 18. Proximate to and inside L of the screen edges 12-18 is a "screen edge area" of the screen 10. The screen 10 also has a "central screen area" 20 inside of the edge area. The central screen area 20 and the edge area together form the display or visible area of the screen 10. Outside of the screen edges 12-18 is defined a virtual or nonvisible screen area. The purpose of these visible and nonvisible screen areas is illustrated and discussed in subsequent figures.

Within the central screen area 20 are several windows. Displaying active windows is what the central screen area 20 is designated for. For example, a window 22 is for an application program called ABC. Within this window are five separate windows 61-65. The windows 61-65 are generally data files, but may be application programs as well. Similarly application program XYZ, indicated as window 24, has other windows 71-73 therein. The windows 71-73 may also represent data files, but here they overlap one another. The window 24 also contains a double-star icon 74 which represents the application XYZ of the window 24. For instance, if application XYZ was for word processing, the icon could be of something related to word processing like a keyboard or sheet of typing paper. With a spreadsheet application the icon could be of a ledger sheet or the like. The icon may also be of a logo of the software vendor which produced the application.

Other windows 26-36 are also shown, which occupy much of the central screen area 20. All of the windows 22-36 in the central screen area are active, i.e. they can be used and executed. This is not unlike a typical work desk that has several different documents and reports laid across the surface which are all being looked at in a somewhat concurrent manner. Details of these other windows will be discussed below.

Figure 2:
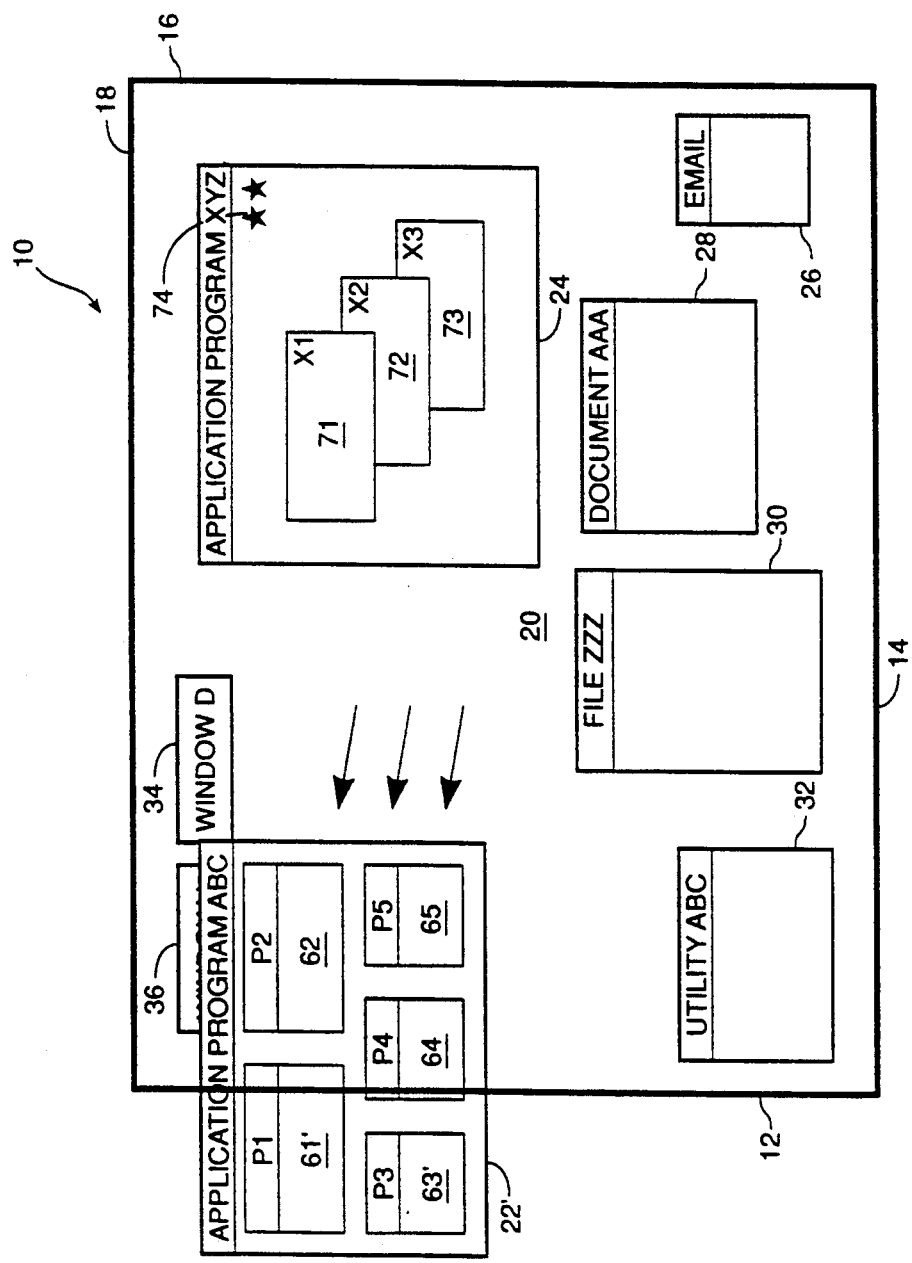

FIG. 2 illustrates a situation where the window 22 is being pushed off the screen along the left edge 12. This is like pushing a document off to the side of your desk when you are through looking at it. As shown here, part of the window 22 has been slid off the screen. Thus, windows 61 and 63 are out of the active viewing area and have become virtual windows 61' and 63' as part of a virtual window 22'. It is a virtual window because it cannot actually be seen, but one gets the sense that it is somehow there, just off the edge of the screen. The other windows 24-36 remain unchanged.

Figure 3:
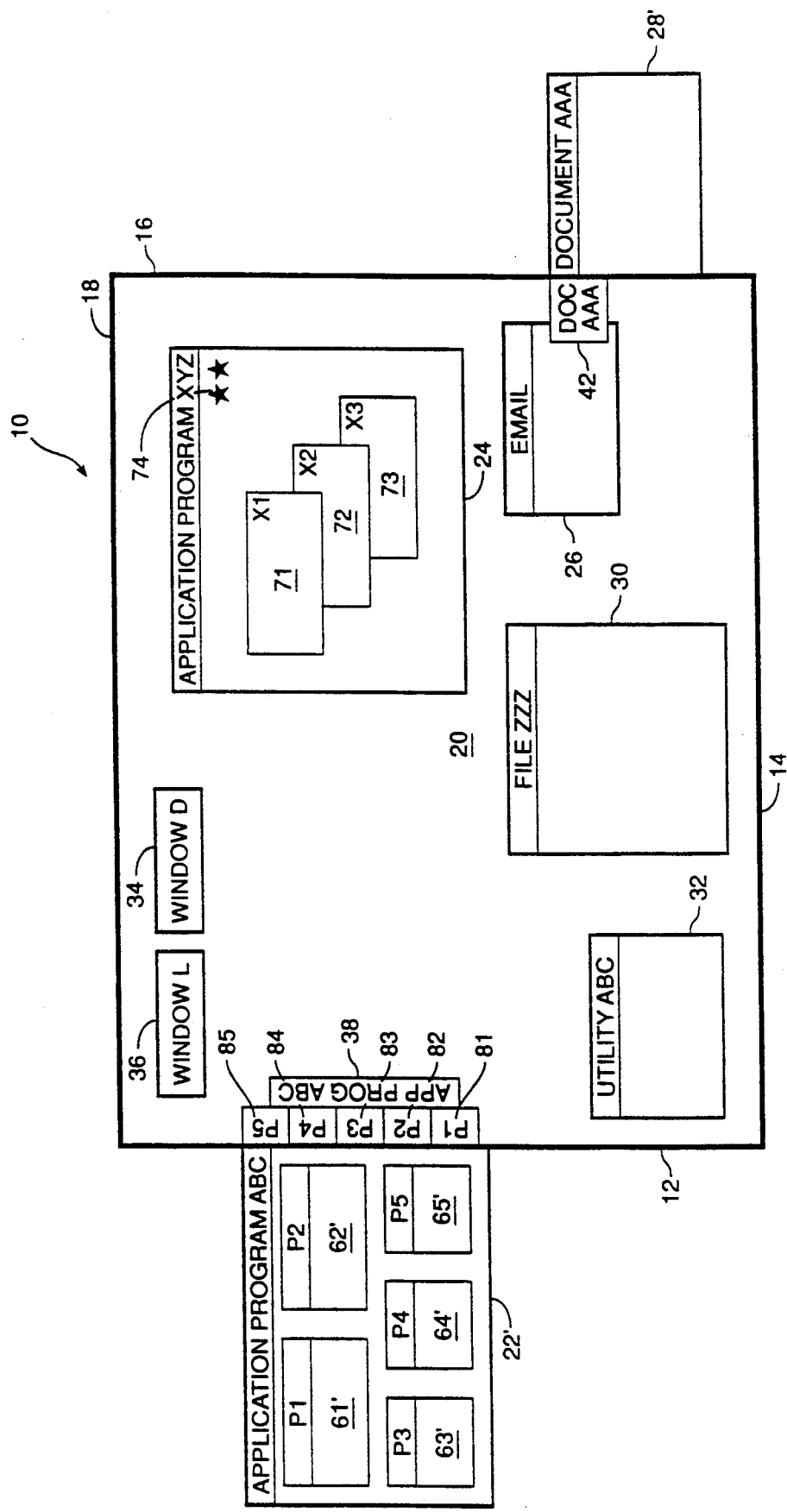

FIG. 3 illustrates that the window 22 is now entirely off the screen. Where it went off the screen are a main window tab 38 and secondary window tabs 81-85. Displaying window tabs is the purpose of the edge area of the screen. These tabs were automatically created when the window 22 was completely slid off the screen. This is like putting the contents of window 22 back into a filing cabinet after it has been completely removed from the desk. However here, the file is not completely out of sight since the window tabs 38 and 81-85 remain along the left screen edge 12. Likewise, document AAA, indicated by reference numeral 28', has been slid off the screen and a tab 42 has been created along the right screen edge 16.

The tabs 38, 42, and 81-85 include labeling which for these tabs is simply the file name or a shortened version of that name. The tabs may also be color coded with different color schemes, such as having a blue background with white lettering, etc. With a gray scale display texturing the window tabs of related windows is possible. Texturing is simply applying some graphical pattern to the tabs, such as cross-hatching. Color coding or texturing tabs of related windows would aid in finding a desired window or group of windows.

Figure 4:
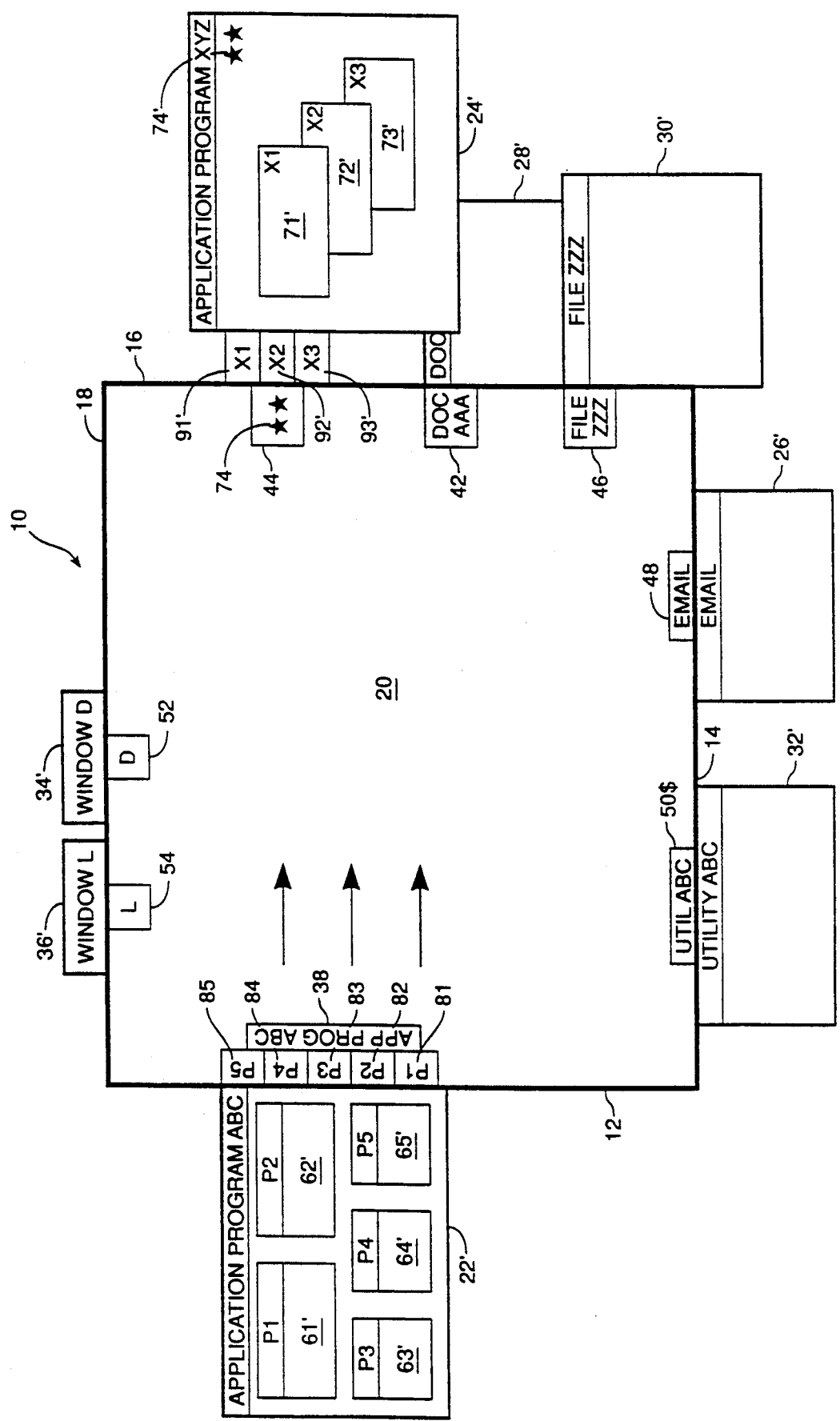
FIGS. 4-6 are display screens showing an application window being pulled into the central area of the screen, in accord with a preferred embodiment of the present invention.

In FIG. 4, the application program XYZ, window 24, has been slid off the screen along the right screen edge 16 to become a virtual window 24', and a window tab 44 has been created in its place. Alternatively, the window 24 could have been "popped" off the screen to the screen edge by double clicking or the like on the window. In either event the window tab 44 contains the double-star icon 74 which is normally associated with application XYZ. Secondary window tabs 91'-93' are off the screen, but may be brought back into the viewing area if desired.

The central screen area 20, in FIG. 4, is free of any actively displayed windows. All of the windows have been pushed off the screen and window tabs have been automatically created for them along the screen edges. Therefore, there is a window tab 46 for window 30, window tab 48 for window 26, window tab 50$ for window 32, window tab 52 for window 34, and window tab 54 for window 36. The application of the window 32 was still running when pushed off the screen, therefore its window tab 50$ blinks until it has finished running. Like the secondary window tabs 91'-93', the secondary window tabs 81-85 for windows 61-65 may be pushed off the screen, to become virtual tabs 81'-85'. With the secondary tabs pushed off the screen, only the main tabs, which may not be pushed off the screen, remain on the screen. The result is that all of the windows 22'-36' are in virtual memory, i.e. offscreen and out of view. This situation represents a cleared off desktop, however, rather than the documents being filed elsewhere, the files are made readily available by the creation of the main window tabs 38-54 along the edges 12-18 of the screen.

The location of a window tab along the screen edges may be determined by where the window leaves the screen, as has been shown in FIGS. 2-4. Alternatively, the window tab could be located at a preselected site, based on a previous location, or by position or type of window. This would be particularly useful when using a "Fast Tab" or "Fast Restore" option, i.e. "popping" windows on and off the screen. The tabs may also be arranged in a stored hierarchy in which tabs are automatically returned to their proper location within that hierarchy.

Figure 5:
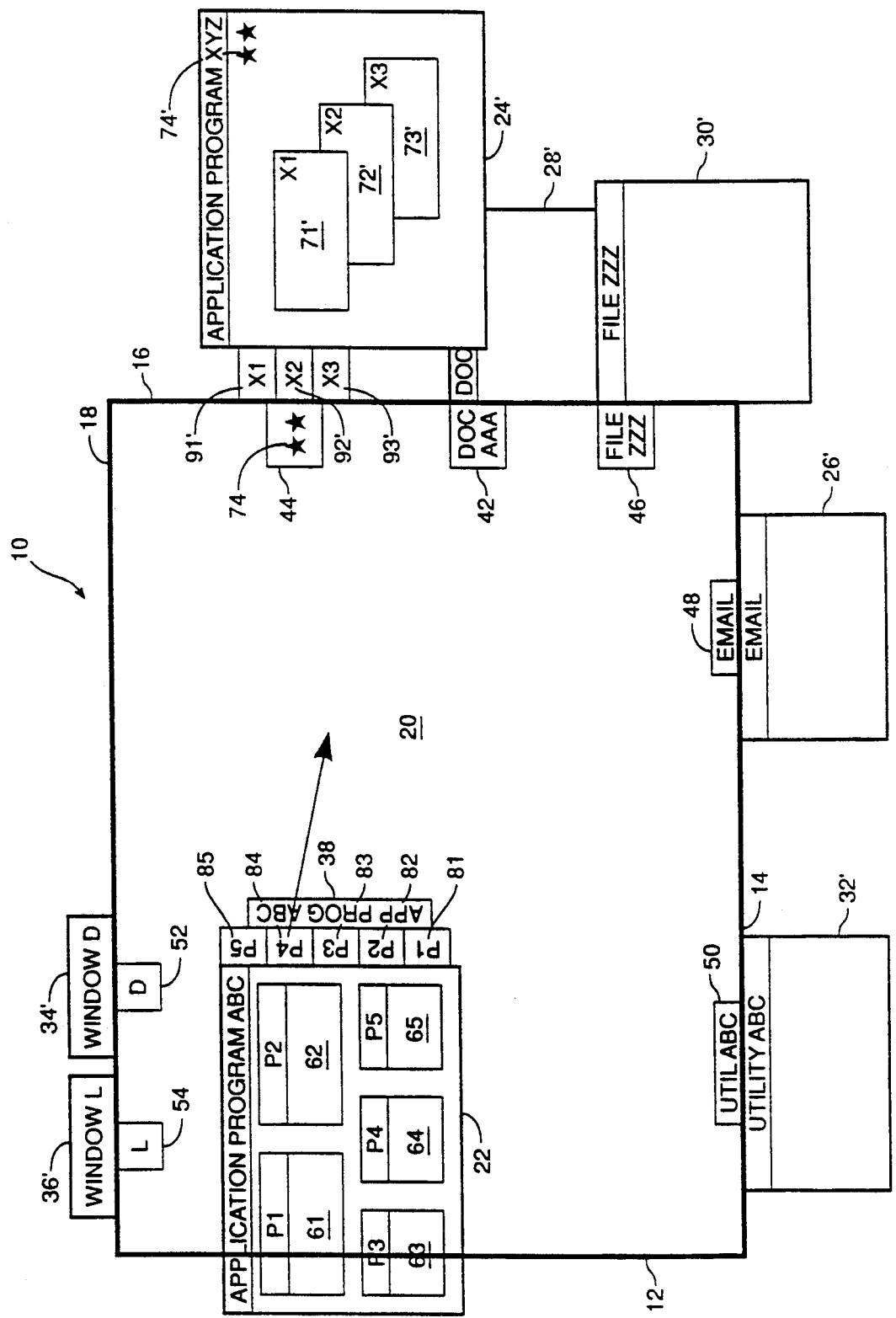

FIG. 4 further illustrates the case of pulling an application window back onto the screen area 20. To begin with, the main tab 38 is used to pull the window 22' back onto the screen, at least until the secondary window tabs 81-85 appear on the screen, at which point one of the secondary window tabs may be selected. As illustrated in FIG. 5, the secondary window tab 84 has been selected and is then used to drag the remainder of the window 22 onto the screen. Alternatively, the main tab 38 may have continued to be used to pull the window 22 onto the screen. Note that the application of the window 32' is no longer running, so its window tab 50 has stopped blinking.

Figure 6:
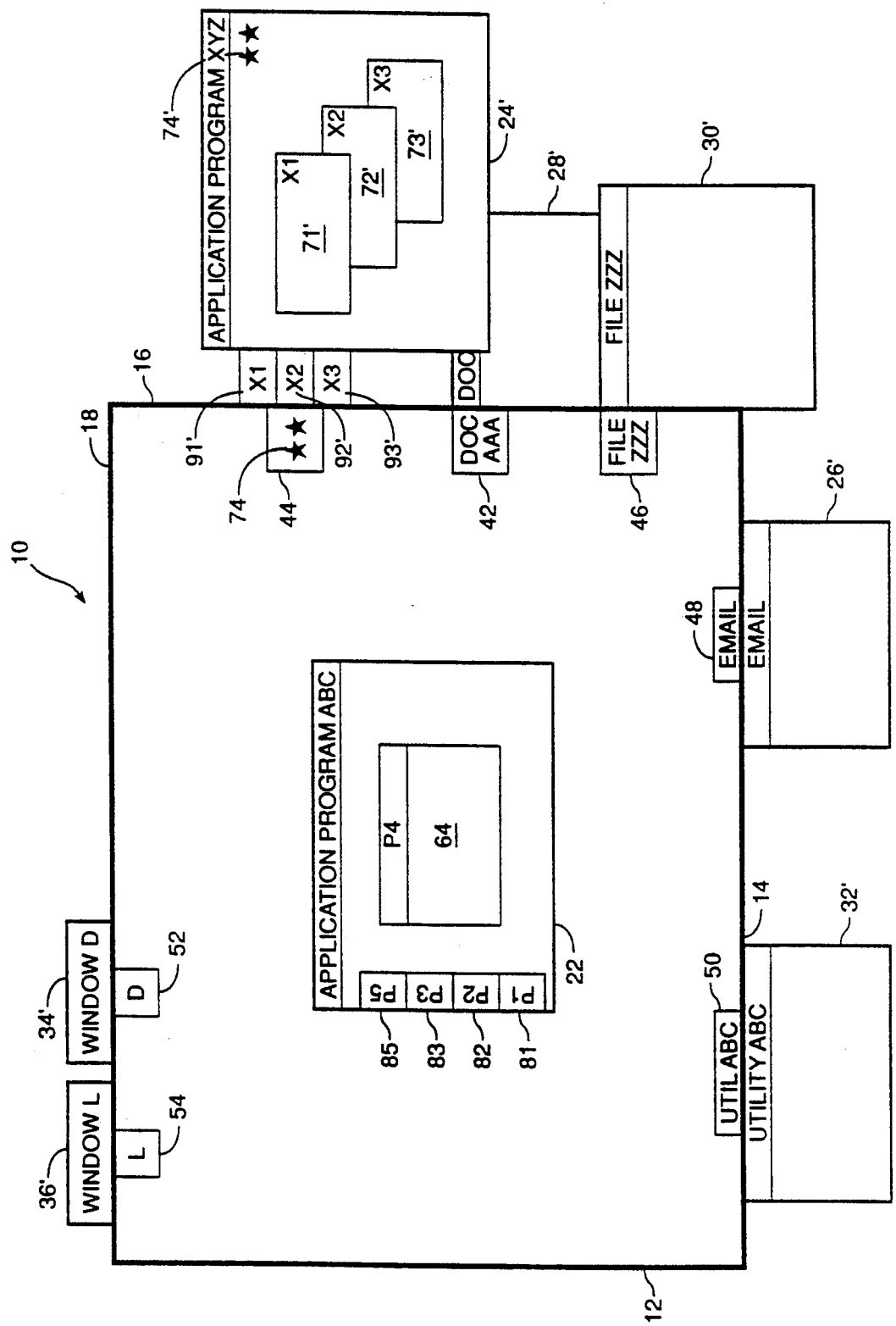
Figure 7:
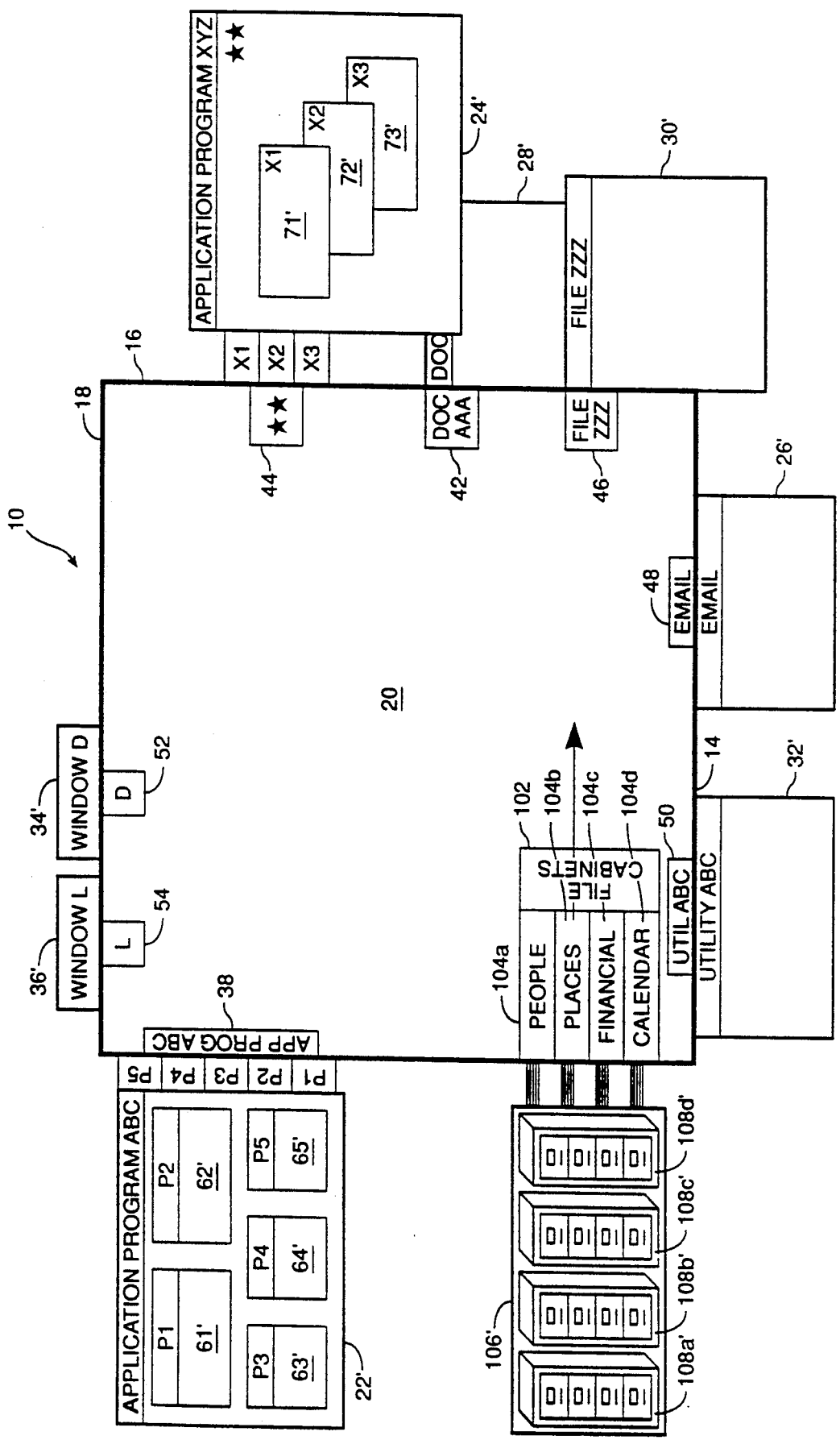
FIGS. 7-10 are display screens showing selection of a particular file within a hierarchy, in accord with a preferred embodiment of the present invention.

FIG. 6 illustrates the situation that by selecting the secondary window tab 84, the window 64 has been activated within the window 22. This occurs when the entire window 22 is pulled into the screen. The secondary tabs 81, 82, 83 and 84 for the remaining windows 61, 62, 63, and 65 are then placed along an edge of the window 22. Thus, a window operating within a window is allowed. This allows for window tabs within windows.

With activating the window 64 within the window 22, the window 22 becomes like the screen 10, in that the central area of the window 22 is now designated for displaying an active window, which in this case is 64. Also, the edge area surrounding the central area of the window 22 is now designated for displaying window tabs for inactive windows, which are in this case 81, 82, 83 and 85. The number of levels of windows operating within other windows is limited by the computer's processing capability and by the resolution and size of the screen.

Rather than dragging the window 22 onto the screen a "Fast Restore" option in which the window 22 is automatically returned to its original position on the screen may be used. This is accomplished by means of taking a defined action, e.g., double clicking on the main window tab 38. The window 64 could be activated within the window 22 in a similar manner. Correspondingly, the window 22 could be automatically returned to its off-screen configuration using a "Fast Tab" option. These options would eliminate the need to drag windows on and off the screen.

FIGS. 7-10 illustrate the features of a filing system incorporated into the display metaphor. Beginning with FIG. 7, a main window tab 102, called File Cabinets, is shown along the left screen edge 12. A secondary tab 104b called "Places", which is attached to the main tab 102, has been selected from a set of secondary tabs 104a-d. These secondary tabs 104a-d represent virtual file cabinets 108a'-d', which are contained in a virtual window 106' off screen. A file cabinet icon may be included on the tabs 104a-d. By selecting tab 104b and dragging it into the central screen area 20, the contents of file cabinet 108b' are also brought into the screen, as described below.

Figure 8:
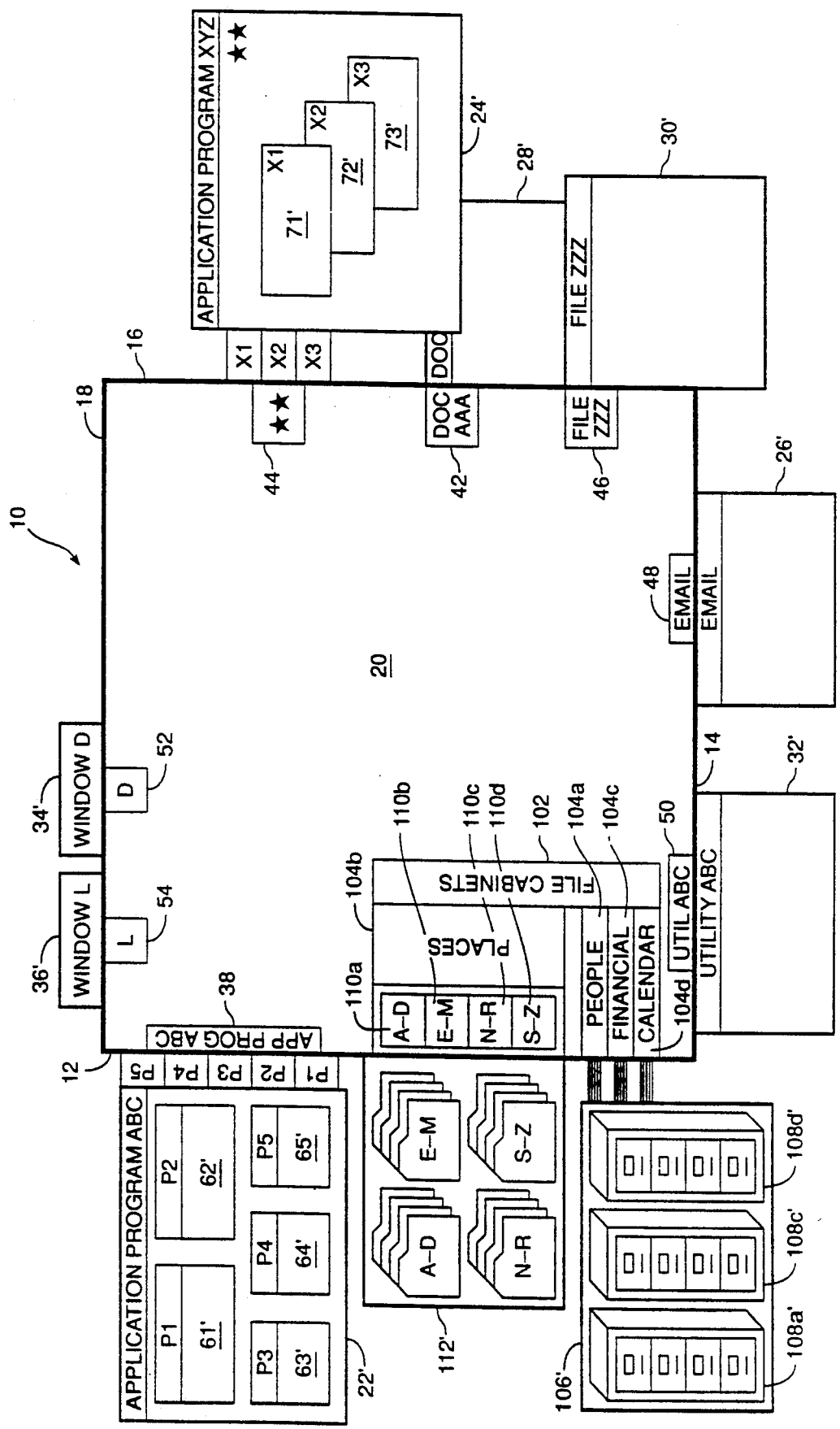
Figure 9:
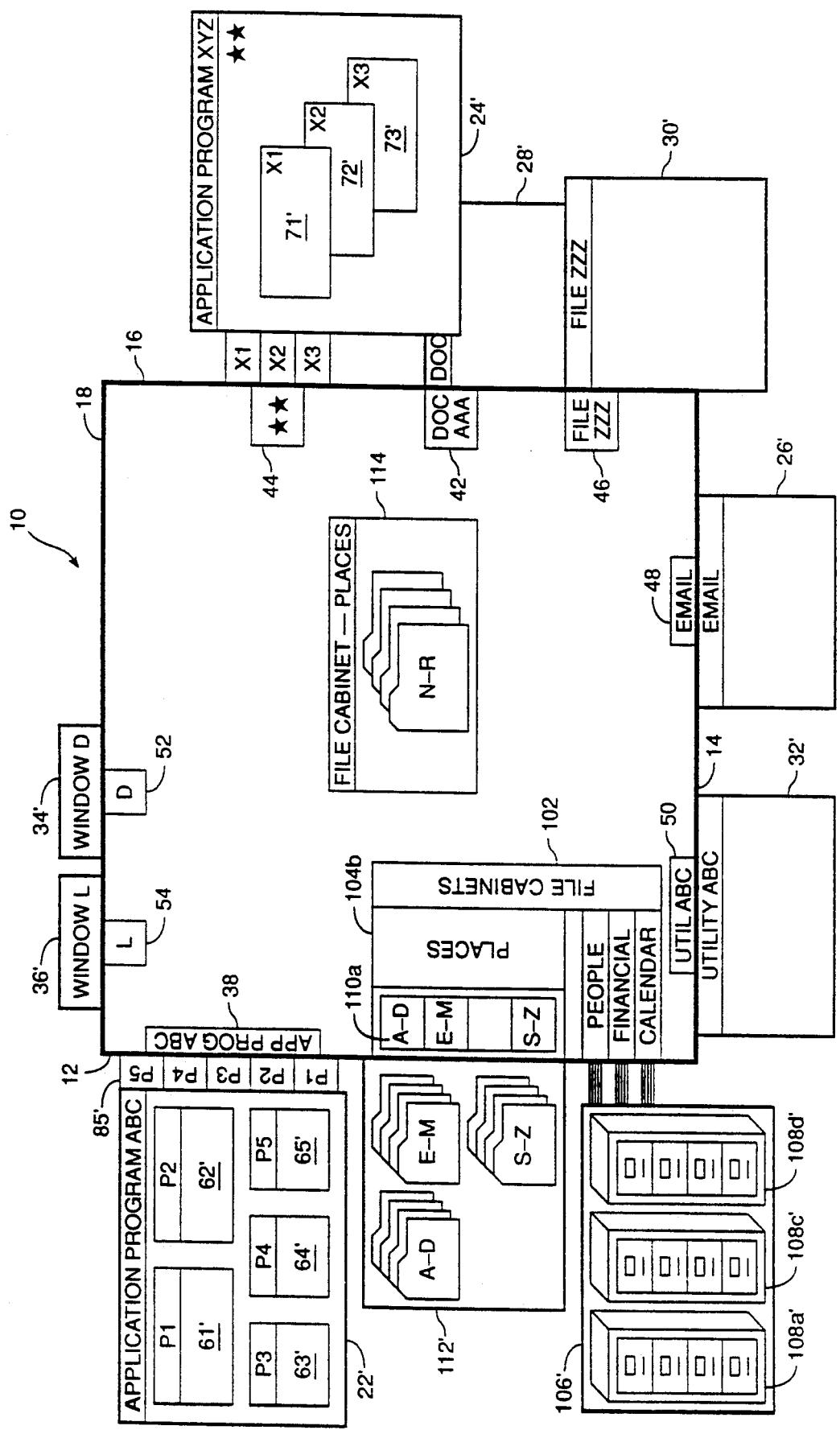

Turning now to FIG. 8, with the "Places" tab 104b being selected and pulled out onto the screen, file drawer tabs 110 a-d appear on the screen. A file drawer icon may be included on tabs 110 a-d. At the same time a virtual window 112' containing the contents of the file cabinet 108b' separated into filing drawers is figuratively created. The file drawer tab 110c is shown being selected and pulled out onto the screen. This results in a window 114 of the file folders of the drawer "N-R" of the virtual window 112' being pulled out onto the screen as shown in FIG. 9.

Once the window 114 is in the central screen area 20, the user may sort through the file folders of the file drawer "N-R" and open a particular file. Known search routines may be incorporated at this point, as well as at earlier points, to help find and open the desired file. In conjunction with search routine techniques, pop-up windows and menus may be employed, as is known in the art.

Figure 10:
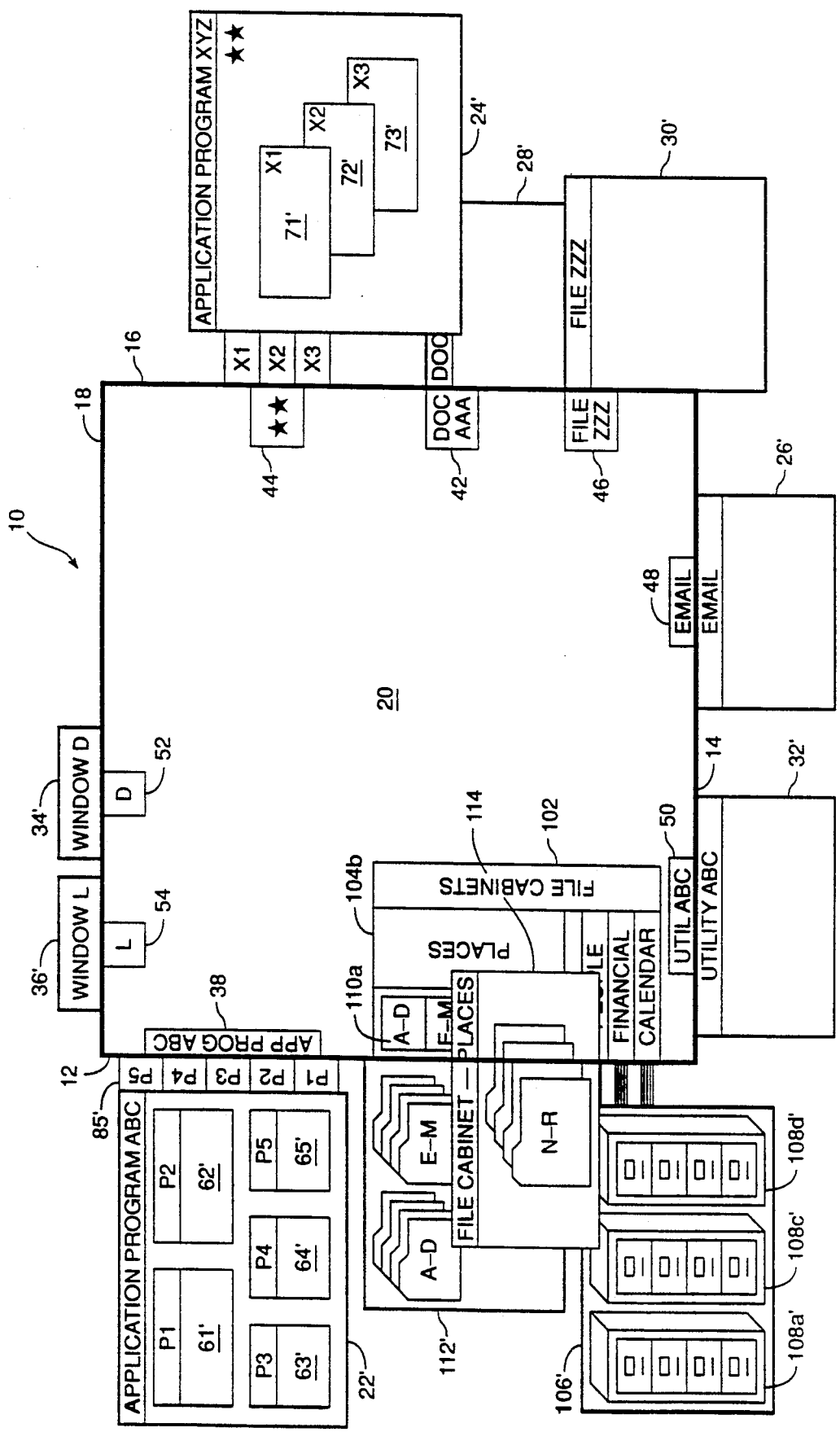

FIG. 10 shows the window 114 of the file drawer "N-R" being moved off the screen. Once the window 114 is completely off the screen its window tab is automatically placed back into the cluster of file drawer tabs 110a-d, as shown in FIG. 8. Thus, as demonstrated with FIGS. 7-10, large numbers of computer windows can be organized in a convenient manner and made readily accessible to the user.

An advantage of the present user interface is seen in that the on-screen actions, e.g., dragging and popping, together with the window tabs displayed around the edges of the screen, combine to give the user the impression that all of the non-displayed windows are stored just off of the screen in a virtual filing system. Because the main window tabs are always displayed, and active windows reference where they came from, the user is not likely to become "lost" among all the windows.

Figure 11:
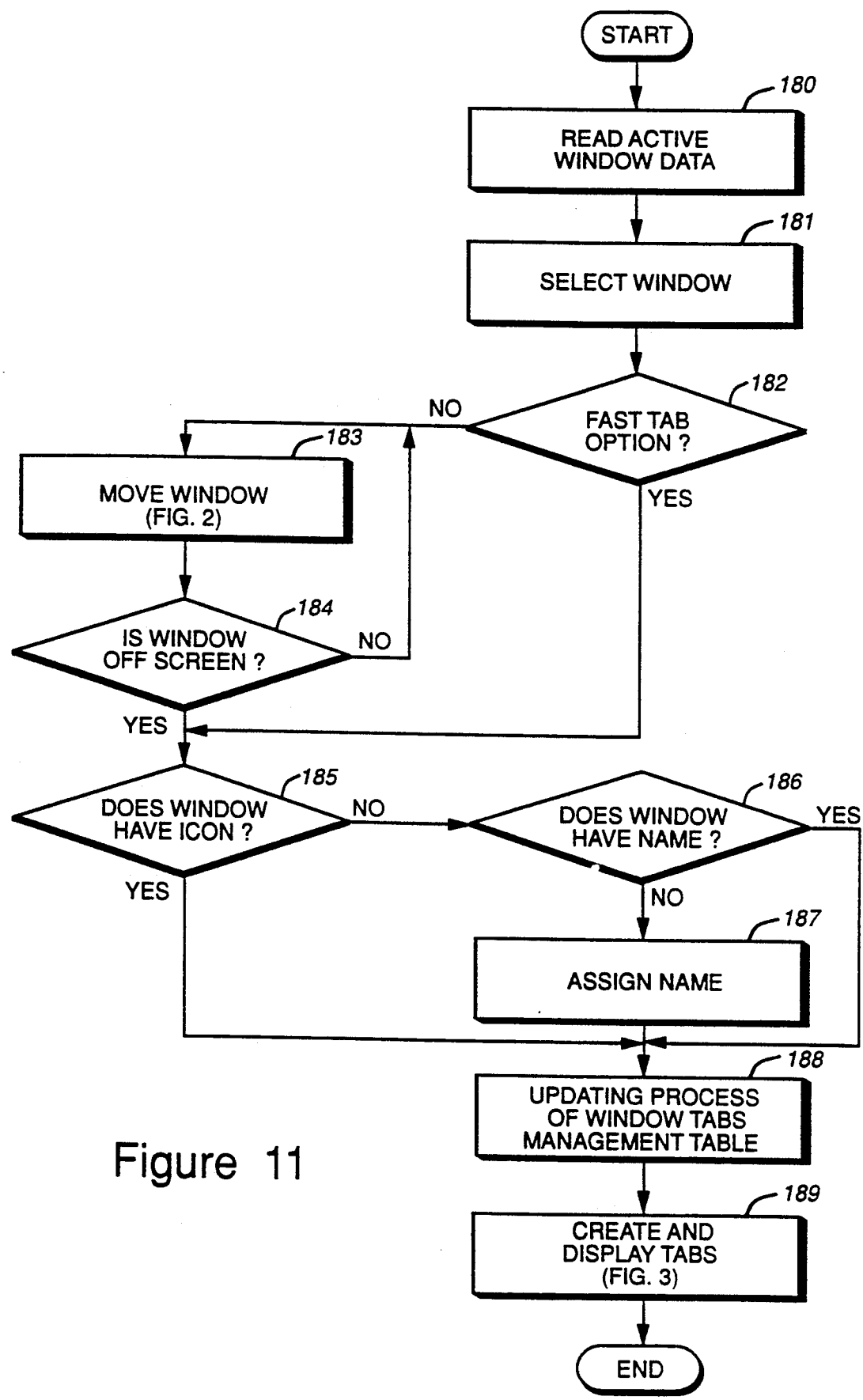
FIG. 11 is a flowchart for a subroutine having reference to FIGS. 1-3.

FIG. 11 is a flow chart of a subroutine for moving a window off the screen, and has reference to FIGS. 1-3. A first step 180 is to read the active window data stored in an active window memory 206 (see FIG. 13). The active window data relates to information defining the various windows that are being displayed and their positions on the screen. The next step 181 is to select a window. This is done by doing some predefined action, like placing a cursor within the window. A mouse or other pointing device may be used for cursor control. At this point a "Fast Tab" option 182 may be used to "pop" the selected window off the screen. This may be done by a predefined action, such as double clicking on the window. Otherwise the window may be moved off the screen by "dragging" it using the cursor. This action comprises steps 183 and 184.

Once the window is off the screen, then a file tab is created for that window. If there is a particular icon associated with that window then the icon is used on the window tab, step 185. If there is no icon, then a name for the window is used, step 186. If there is no name, then one is assigned, step 187. The name may be automatically created or input by the user. Typically, though, file names are asked for or created by the application program which was used to create the file originally. Once the identifying information for the tab is determined, e.g. icon or name, that information is added to a Window Tabs Management Table 210 (see FIG. 13) in step 188. Finally the tab is displayed in step 189.

Figure 12:
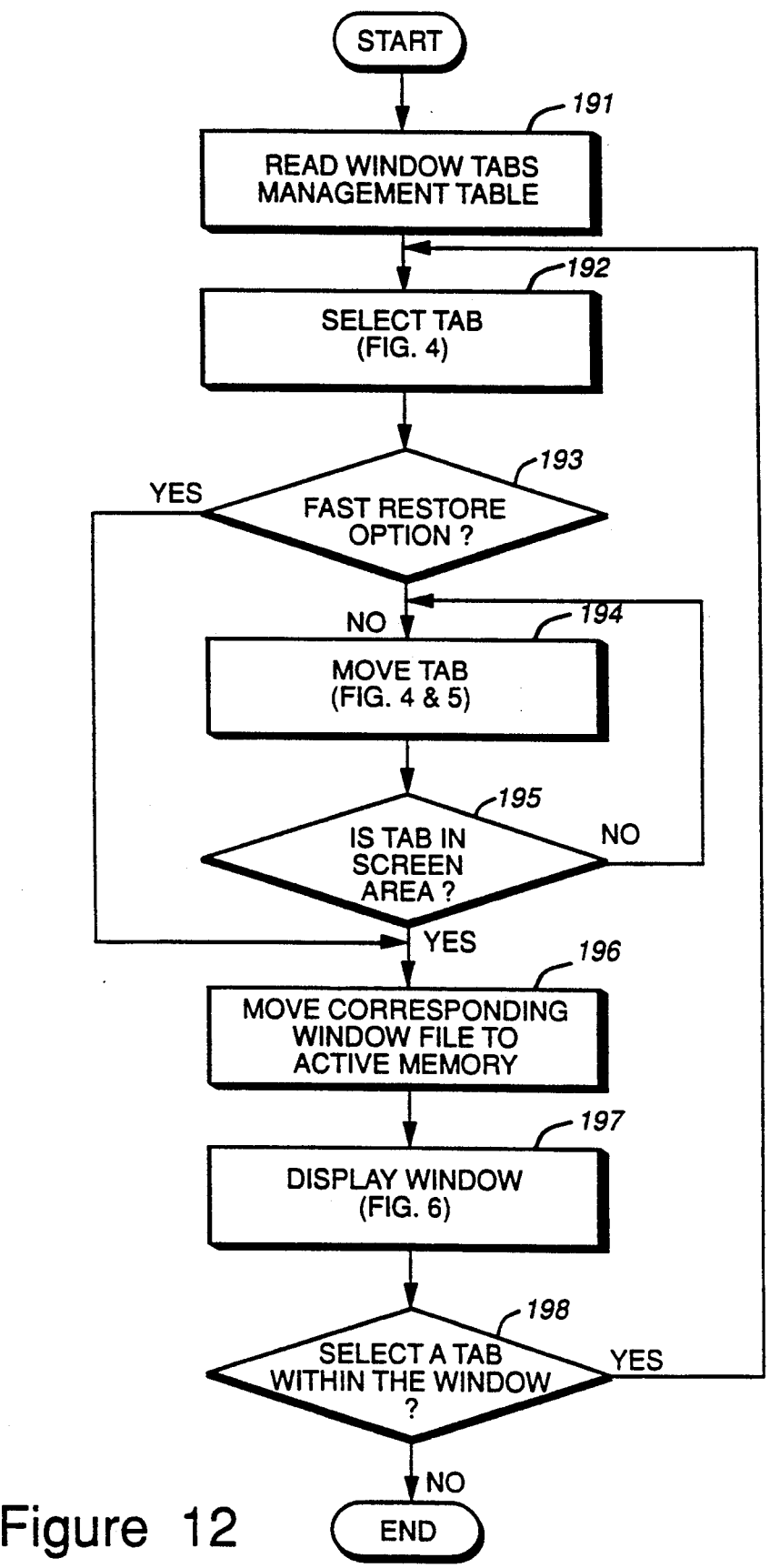
FIG. 12 is a flowchart of a subroutine having reference to FIGS. 4-6.

FIG. 12 is a flow chart of a subroutine for bringing a window which is off screen back onto the screen. This operation relates to FIGS. 4-6. The operation begins with the step 191 of reading the data stored in the Window Tabs Management Table 210 (see FIG. 13). This is followed by the step 192 of selecting a particular tab, by placing a cursor on it. At this point a "Fast Restore" option, step 193, may be selected by some predefined action, such as double clicking. If the "Fast Restore" option is not used, then the tab is "dragged" onto the central screen area, steps 194 and 195. Once the tab is in the central screen area, the corresponding window file is moved to the active memory 206 (see FIG. 13), step 196. At this point the window may be displayed as it is pulled onto the screen, step 197. A further option is to select a tab for a window within the main window, step 198, and then to repeat steps 192 to 197.

Figure 13:
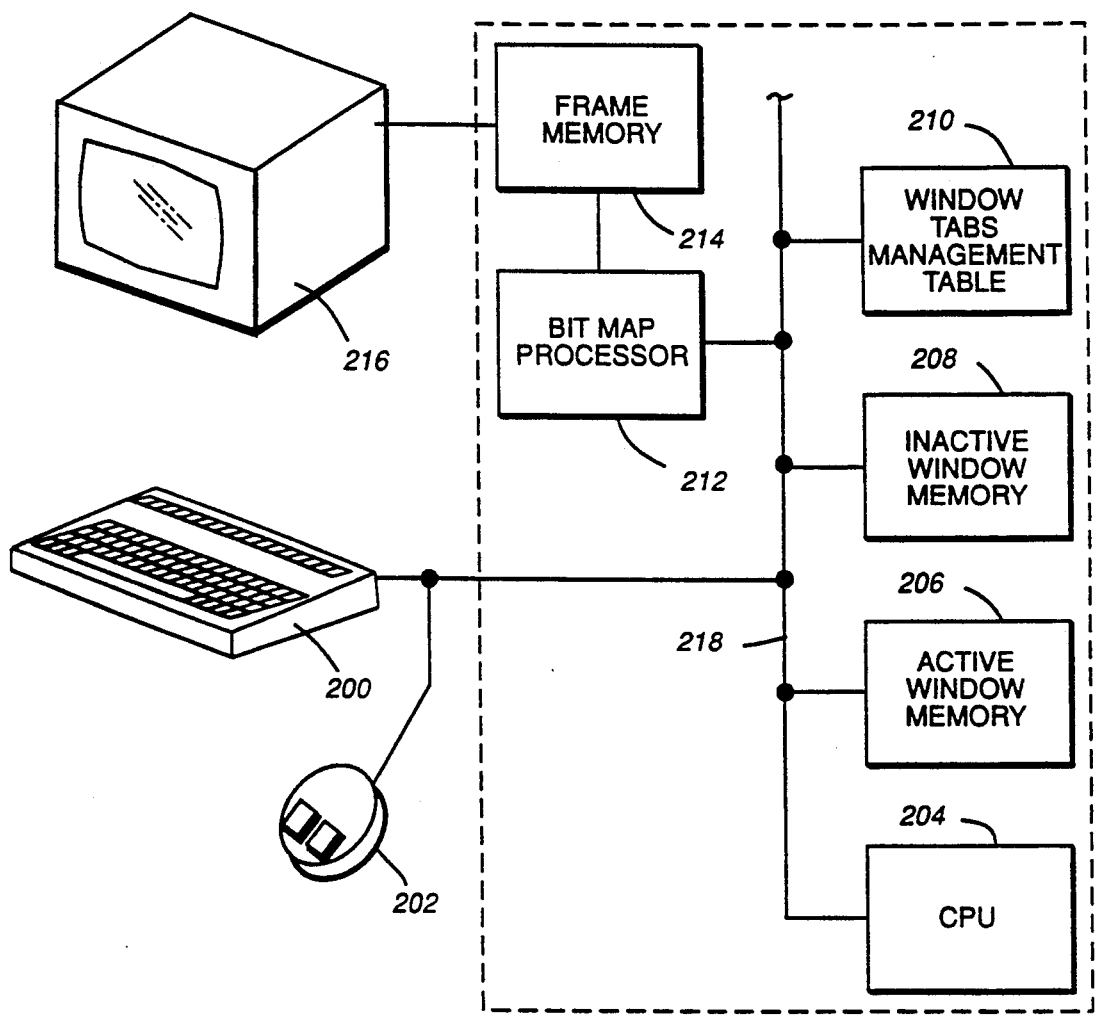
FIG. 13 is a simple block diagram of a computer system for carrying out the present invention.

FIG. 13 illustrates a computer system for operating a computer display screen in the manner described above. The system comprises an input device, such as a keyboard 200 and a pointing device, such as a mouse 202. These devices are connected to a CPU 204 via a data bus 218, which represents the various cables used to connect the different system components together.

The memory of the system includes an Active Window Memory 206 for storing information pertaining to active windows, which are those windows being displayed. An Inactive Window Memory 208 is for storing information related to inactive windows. A mass storage device, such as a hard disk, could be used for this purpose. In addition, a Window Tabs Management Table 210 is maintained. This table stores information for displaying the window tabs around the edges of the screen. This information would include position, order, pointers to the corresponding window in the Inactive Window Memory 208, and pointers to associated tabs. Indeed, the Window Tabs Management Table 210 acts as a directory for all of the computer files and windows.

Display data is transferred to a bit map processor 212 in accordance with the Active Window Memory 206 and the Window Tabs Management Table 210. The bit map processor 212 expands the display data as a bit map in a frame memory 214. A controller, not shown, then sequentially reads out the content of the frame memory 214 and outputs this data to a CRT 216.

I claim:

1. A computer windows management system comprising:

a display screen having a central display area and having an edge area between the central display area and a boundary of the display screen, the central display area being designated for displaying computer windows;

means for displaying a window tab upon removal of a computer windows from the display screen that the window tab has an appearance of being attached to the computer window and such that the window tab is arranged along the edge area of the display screen;

cursor means under operator control for selecting among a plurality of windows tabs to display desired computer windows on the central display area of the display screen and for selecting computer windows to be removed from the display screen;

first means responsive to selection of a first window tab by the cursor means for manipulating a first computer window in a manner to simulate popping of the first computer window to the central display area from a non-displayed area completely beyond the boundary of the display screen in an absence of a user dragging the first computer window using the cursor means; and second means responsive to the cursor means for manipulating a second computer window in a manner to gradually remove the second computer window completely from the display screen by simulating sliding of the second computer window from the central display area to a non-displayed area completely beyond the boundary of the display screen, the second means being in software communication with the means for display a window tab so that a second window tab appears along the edge area of the display screen in place of the completely removed second computer window.

2. The system of claim 1 wherein said window tabs each resembles a tab used in an office file system.

3. The system of claim 2 further comprising means under user control for modifying an image of each of the window tabs to be displayed, thereby visually distinguishing window tabs.

4. The system of claim 1 further comprising a first memory for storing application programs and for storing files to be displayed upon selecting a computer window.

5. A method of managing computer windows for displaying stored data comprising:

providing a display screen having a plurality of window tabs for identifying computer windows, including a first window tab for identifying a first computer window, each window tab extending from a boundary of the display screen, initiating an open command to open the first computer window for viewing stored data on the display screen, wherein initiating the open command includes directing a cursor to a window tab for identifying the first computer window, and in response to the open command, simulating dragging a rectangular document from a non-displayed area completely beyond the boundary of the display screen without a user dragging the first computer window using a cursor device by displaying the first computer window on the display screen such that a first edge of the first computer window enters at a boundary of the display screen and moves in a direction away from the boundary of the display screen, while parallel second and third edges of the first computer window remain a fixed distance apart.

6. The method of claim 5 further comprising initiating a close command to remove from the display the first computer window and, in response to the close command, moving the first edge of the first computer window back to the boundary of the display screen.

7. The method of claim 6 further comprising displaying stored data within said first computer window during the movement of the first edge, the stored data moving along the display screen simultaneously with said first edge.

8. The method of claim 5 wherein the first window tab moves along the display screen simultaneously with the first edge during the displaying of the first computer window.

9. A method of managing computer windows of a computer system having a display screen, each computer window having a capability of being activated wherein information contained therein is displayed on the display screen, each computer window further having a capability of being inactivated wherein the computer window and information therein is removed from the display screen, the method comprising:

operating the computer system such that the display screen is organized into a central display area and an edge display area, including reserving the central display area from activating computer windows and further including displaying window tabs within the edge display area for identifying particular computer windows which have been inactivated, each window tab having an appearance of being coupled to each one of the computer windows;

generating computer files within a memory of the computer system such that each computer file is viewable within one of the computer windows;

viewing a first computer file, including generating an open command by designating a first window tab within the edge area;

activating a first computer window in response to the open command, including displaying the first computer file, further including simulating moving the first window tab from the edge display area toward the central display area from a non-displayed location entirely beyond an edge of the display screen into the central display area without a user dragging the first computer window using a cursor device; and inactivating the first computer window including simulating moving of the first computer window such that the first computer window appears to move entirely beyond the edge of the display screen so that the window and information therein is removed from the display, and such that first window tab is displayed along the edge display area in place thereof.

10. The method of claim 5 wherein the response to the open command further comprises removing the window tab corresponding to the first computer window from the display screen.

* * * * *